Figure 1:
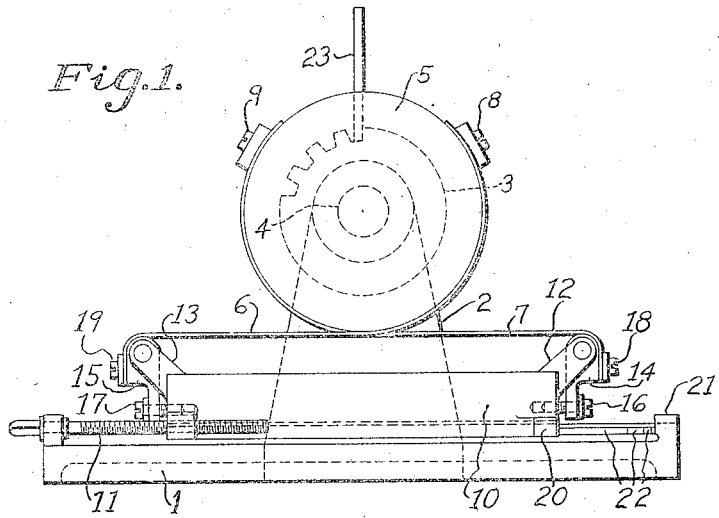

Jan. 1, 1924

A. F. T. LÖFQUIST 1,479,144

MACHINE FOR PRODUCING INDEX DISKS AND THE LIKE

Filed May 4, 1921

INVENTOR.
A. F. T. Löfquist
BY
Rogers, Kennedy & Campbell
ATTORNEYS.

Patented Jan. 1, 1924.

1,479,144

UNITED STATES PATENT OFFICE.

AXEL FREDRIK THURE LÖFQUIST, OF UTBYNAS VILLASTAD, NEAR GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

MACHINE FOR PRODUCING INDEX DISKS AND THE LIKE.

Application filed May 4, 1921. Serial No. 466,787.

*To all whom it may concern:*

Be it known that I, AXEL FREDRIK THURE LÖFQUIST, a subject of the King of Sweden, residing at Utbynas Villastad, near Gottenborg, in the Kingdom of Sweden, have invented new and useful Improvements in Machines for Producing Index Disks and the like, of which the following is a specification, reference being had to the drawing accompanying and forming a part thereof.

The present invention relates to a machine for producing index disks, and the like. The object of the invention is to provide an extremely accurate angular adjustment of the index disk to be produced so that, supposing the position of the working part or parts of the tool to remain unchanged, the distances between the index spaces of the disk, measured f. i. along the circumference of the disk, remain exactly equal. The invention consists, essentially in this that, in obtaining subsequent index spaces, the angular adjustment of the disk is effected by means of a turning band placed around the axle of the disk, or a part concentric therewith, and in the amount of the angular adjustment being determined by linear measurement of the wound or unwound portion of the turning band.

Figure 2:
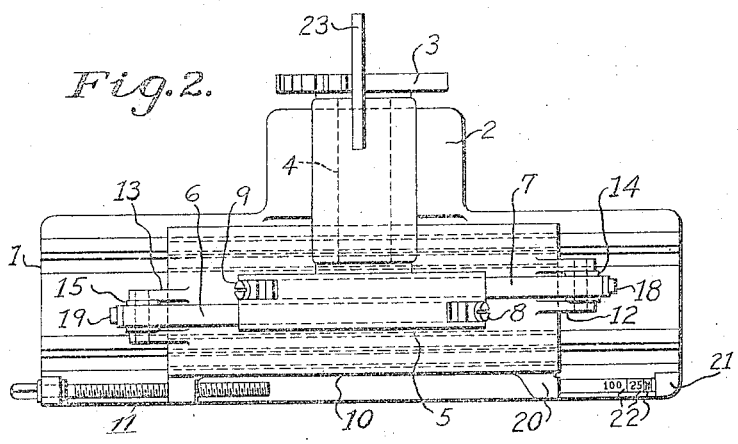
Figure 3:
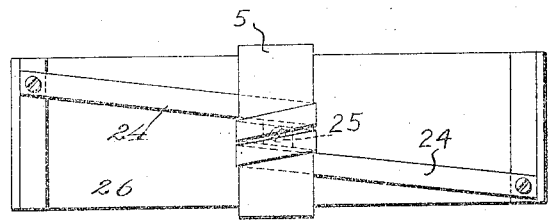
Figure 4:
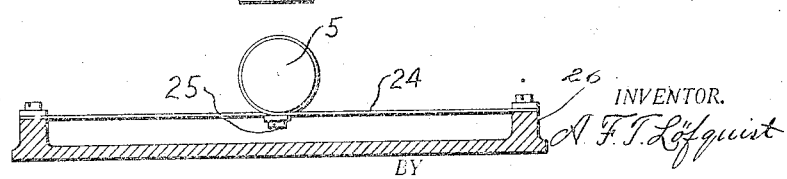

In the annexed drawing, a form of embodiment of a machine according to this invention is shown. Fig. 1 is a side view of the machine. Fig. 2 is a top view thereof. Fig. 3 shows a modified arrangement of the turning band, viewed from above. Fig. 4 is a side view thereof.

In the machine shown in Figs. 1 and 2, 1 designates a frame provided, at one side, with a standard 2 forming a bearing for the axle 4 of the index disk 3. Attached to the axle 4, besides the index disk 3, is a cylinder 5 around the circumference of which there are placed two turning bands 6 and 7 firmly connected to the cylinder 5, by screws 8 and 9. Placed on the frame 1 is, further, a slide 10 adapted to be moved in one or the other direction by means of a screw 11 journaled in the frame 1. Situated at each end of the slide 10 is a system of arms 12, 13, respectively, in each of which is journaled the axle of a double-armed lever 14, 15, respectively, adapted to be adjusted and kept in position by screws 16, 17, respectively, threaded into the slide 10. Attached to these levers 14, 15, by screws 18 and 19, are the free ends of the turning bands 6 and 7, the latter being carried over the suitably rounded upper ends of the levers so that, by adjusting the screws 16 and 17, the tension of the turning bands, which are suitably made of steel, can be regulated. Now, it is clear that, by moving the slide 10 by means of the screw 11, the cylinder 5, and thus also the index disk 3, will be caused to turn. It is also clear that the extent of the sliding movement of the slide 10 is exactly equal to the angular adjustment of the index disk 3, measured in length of arc along the circumference of the cylinder 5. Owing to the fact that the length of arc along the circumference of the cylinder 5 can be easily determined mathematically, it is clear that, by moving the slide 10 a corresponding length, an angular adjustment of the index disk 3 corresponding to the desired pitch can be effected. In the form of embodiment of the machine illustrated, this is effected by placing, between a shoulder 20 on the slide 10 and a shoulder 21 on the stationary frame 1, an end gauge 22, or more, suitably end measuring rods of the, so-called, Johansson measure, said rods limiting the movement of the slide 10, at each adjustment, to correspond to the desired angular adjustment (pitch) of the disk 3. In the machine shown, the tool is in the form of a grinding disk 23 by means of which the side surfaces of the teeth of the index disk 3, which are made in advance by cutting or the like, are finished. In order to provide for an exact indexing, it is necessary that the working grinding surface is always kept in a predetermined position, which can be effected by a suitable adjusting device for the grinding disk. In the arrangement of the turning bands 6 and 7 shown in Figs. 1 and 2, it is not possible to cause the index disk 3 to turn through a whole revolution. To that end, each rolling band must, obviously, extend at least half around the cylinder 5.

In Figs. 3 and 4, a device is shown having a turning band 24 attached to the cylinder 5 by means of a screw 25 and extending twice around the cylinder so that the cylinder 5 can be turned wholly round in either direction, the turning band being helically wound on the cylinder. The free ends of the turning band 24 are firmly connected, as in the form of embodiment shown in Figs. 1 and 2, to a slide 26 movable relatively to the cylinder 5.

The invention is, obviously, not limited to grinding of index disks, as shown in the drawing, it being understood that a cutter, a drill or other cutting tool can be substituted for the grinding disk.

I claim:

1. A device comprising in combination a frame, means thereon for holding the work to permit of its angular movement, a member adapted to be connected with the work in co-axial relation thereto, a turning band engaged with said member, and means for displacing the band to turn the work; whereby the amount of angular movement may be determined by measuring the amount of displacement of the band.

2. A device comprising in combination a frame provided with a shoulder, means on the frame for holding the work to permit of its angular movement, a cylindrical member adapted to be disposed in concentric relation to the axis of the work, a slide movable on the frame and provided with a shoulder, a turning band engaging said concentric member and slide, and gauging means adapted to be inserted between said shoulders to limit the motion of the slide.

3. A device comprising in combination a frame, means thereon for holding the work to permit of its angular movement, a cylindrical member adapted to be connected with the work in co-axial relation thereto, a slide movable on the frame, and two turning bands connected at one of their ends to said cylindrical member and connected at their opposite ends to the slide.

4. A device comprising in combination a frame, means on the frame for holding the work to permit of its angular movement, a slide movable on the frame, a cylindrical member adapted to be connected to the work in co-axial relation therewith, and a turning band connected with said member and connected adjustably with the slide.

5. A device comprising in combination a frame, means on the frame for holding the work to permit of its angular movement, a slide movable on the frame, a cylindrical member adapted to be connected to the work in co-axial relation therewith, an adjustable lever carried by the slide, and a turning band connected respectively with said adjustable lever and with said member.

6. A device comprising in combination a frame, means on the frame for holding the work to permit of its angular movement, a slide movable on the frame, adjustable levers carried by the slide, a member adapted to be connected with the work in co-axial relation thereto, and two turning bands each connected at one end with the said member and at their opposite ends respectively with the two levers.

In testimony whereof I have signed my name.

AXEL FREDRIK THURE LÖFQUIST.